United States Patent [19]

Henningsgaard

[11] Patent Number: 4,531,352
[45] Date of Patent: Jul. 30, 1985

[54] FRUIT PICKER WITH STEM CUTTING JAWS

[76] Inventor: Russell W. Henningsgaard, 504 - 5th Ave. S., Hopkins, Minn. 56343

[21] Appl. No.: 602,823

[22] Filed: Apr. 23, 1984

[51] Int. Cl.³ .................................................. A01D 46/00
[52] U.S. Cl. .......................................... 56/336; 56/334
[58] Field of Search ................. 56/333, 334, 335, 336, 56/337, 338

[56] References Cited

U.S. PATENT DOCUMENTS

| | | | |
|---|---|---|---|
| 94,457 | 8/1869 | Ward | 56/334 |
| 1,133,927 | 3/1915 | Buzard | 56/337 |
| 1,209,732 | 12/1916 | Leonard | 56/334 |
| 2,796,721 | 6/1957 | Mattei | 56/334 |
| 3,199,280 | 8/1965 | Wilczek | 56/334 |

FOREIGN PATENT DOCUMENTS 117179  7/1918  United Kingdom .................. 56/334

*Primary Examiner*—Gene Mancene
*Assistant Examiner*—David J. Tarnoff
*Attorney, Agent, or Firm*—Williamson, Bains, Moore & Hansen

[57] ABSTRACT

A pole mounted, fruit picking device for collecting fruit from trees. The fruit picker is comprised of a double ring jaw assembly mounted on the top end of a pole, with the bottom jaw being stationary and having a receiving bag or chute attached to it. The upper ring has a cutting edge and is pivotally movable by a pull device on the pole handle to snap down against the lower jaw and sever a fruit stem. The severed fruit drops through the bottom ring into the receiving chute. Flexible guard bands on the top ring extend around both sides of the cutting edge, and serve to protect the fruit against damage as a fruit stem is severed.

4 Claims, 5 Drawing Figures

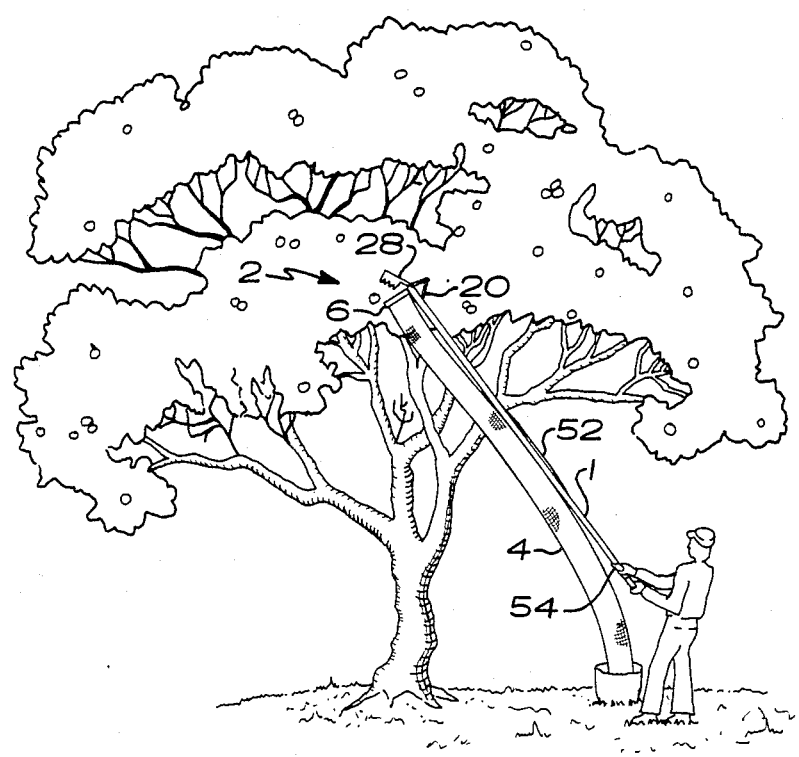
Fig. 1
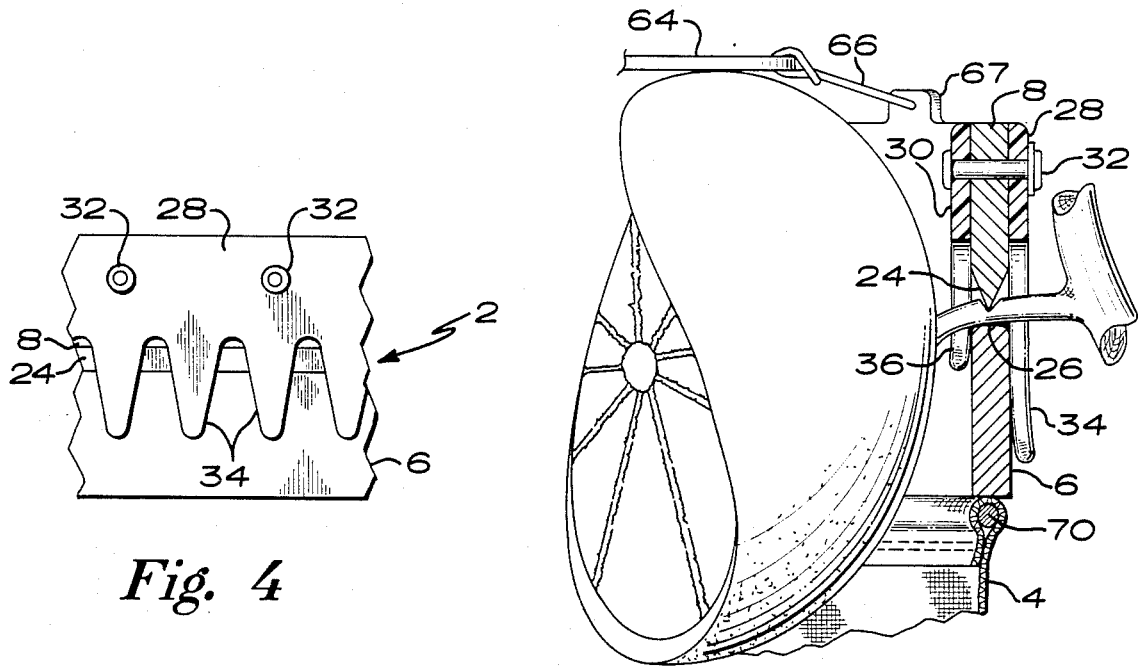
Fig. 4
Fig. 5

FRUIT PICKER WITH STEM CUTTING JAWS

BACKGROUND OF THE INVENTION

This invention relates to the field of fruit picking devices, and in particular to such devices having a fruit picker mounted on one end of an elongated pole which serves as a gripping handle. The picker is comprised of a pair of jaws movable relative to one another by a pull device mounted on the handle for severing a fruit stem.

Fruit pickers of this general type originally comprised a wire basket at the end of a long pole. The problem with these devices was that they could not be satisfactorily used to retrieve fruit from the top branches of trees without pulling down on some branches and thereby breaking branches and damaging fruit, with some fruit being caused to drop to the ground.

The more recent developments in this field utilize gripping jaws as a fruit picking device, and simulate the picking action which would be obtained by simply grasping a piece of fruit in one's hand and pulling the fruit off of a tree branch. U.S. Pat. Nos. 3,668,848, 2,581,236, and 3,365,870 disclose such picking devices. The disadvantage with such fruit pickers arises from pulling the fruit off of its stem. If the stem is pulled out of the fruit, the fruit tends to spoil. Fruit with the stem attached commands a higher price in the market place.

Fruit pickers are known which employ jaws with one or more cutting edges to sever a piece of fruit from its stem. U.S. Pat. Nos. 1,255,596 and 2,072,558 disclose fruit pickers of this type. U.S. Pat. No. 1,586,867 also discloses a fruit picker having movable jaws mounted on one end of a handling pole. The devices disclosed in U.S. Pat. Nos. 1,255,596 issued to H. Gielow and 2,072,558 issued to M. Hunt, as well as the aforesaid U.S. Pat. No. 1,586,867 issued to E. J. Warner suffer from the disadvantage that the receiving bag or chute is attached to the movable jaw or ring. This type of arrangement interferes with the free movement of the pivotal, severing action of the cutting jaw. It is also difficult with such a jaw and receiving bag assembly to properly position the jaw carrying the receiving bag so as to have the bag in position to properly receive the fruit after it is severed from a branch. U.S. Pat. No. 1,968,414 issued to G. E. Melown does disclose a fruit picker having a stationary bottom jaw with a receiving bag attached to it, and a pivotal upper jaw. However, the actuating mechanism for the pivotal upper jaw is complex, and Melown provides no means for cutting a fruit stem without damaging the fruit. The aforesaid patents to Hunt and Gielow also provide no means for guarding against damage to the fruit by the cutting edge formed on a movable jaw.

BRIEF SUMMARY OF THE INVENTION

Having in mind the aforesaid disadvantages and shortcomings associated with prior art fruit pickers, I have designed an improved fruit picker particularly characterized by the simplicity of its operating mechanism and by a cutting jaw and receiving chute arrangement which permits the effective cutting of fruit stems and the collecting of severed fruit at a receiving chute without damaging the fruit.

These basic improvements and advantages have been realized by a fruit picker construction which incorporates a stationary lower jaw angularly mounted at the top end of a handling pole, and a top, cutting jaw which is pivotally attached to the top of the pole. The top jaw has a cutting edge which is movable into contact with the substantially flat, top surface of the bottom stationary jaw to provide a very effective cutting action.

Advantageously, a flexible receiving bag or chute is attached around the periphery of the bottom, stationary jaw. This permits the stationary jaw to be easily positioned under a piece of fruit in position to receive the fruit when it is severed from its stem. The positioning of the lower jaw and the accessibility to fruit is further simplified and improved by spring loading the movable, upper jaw so that it is normally held in an open position. A pulling device, which preferably comprises a pull cord attached through a harness arrangement to the top jaw, is utilized for quickly and easily pulling the top jaw down against the stationary lower jaw in a snap action type of stem cutting operation.

A further particularly beneficial aspect of the improved fruit picker resides in the use of a pair of flexible guard bands positioned around the periphery of the top cutting jaw on both sides of its cutting edge. The guard bands are preferably made of flexible plastic and are formed with downwardly projecting teeth which permit a fruit stem to be gripped between the jaws of the fruit picker, and which also effectively function to assist in gripping a fruit stem in the course of a stem cutting operation.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a pictorial view showing the improved fruit picker as used in picking fruit from a tree;

FIG. 4 is a fragmentary, side elevation view of the ring assembly taken along lines 4—4 of FIG. 3 and showing the ring jaws in their closed, stem cutting position; and FIG. 5 is a vertical, section view of the ring jaws taken along lines 5—5 of FIG. 3.

DESCRIPTION OF THE PREFERRED EMBODIMENT

Figure 2:
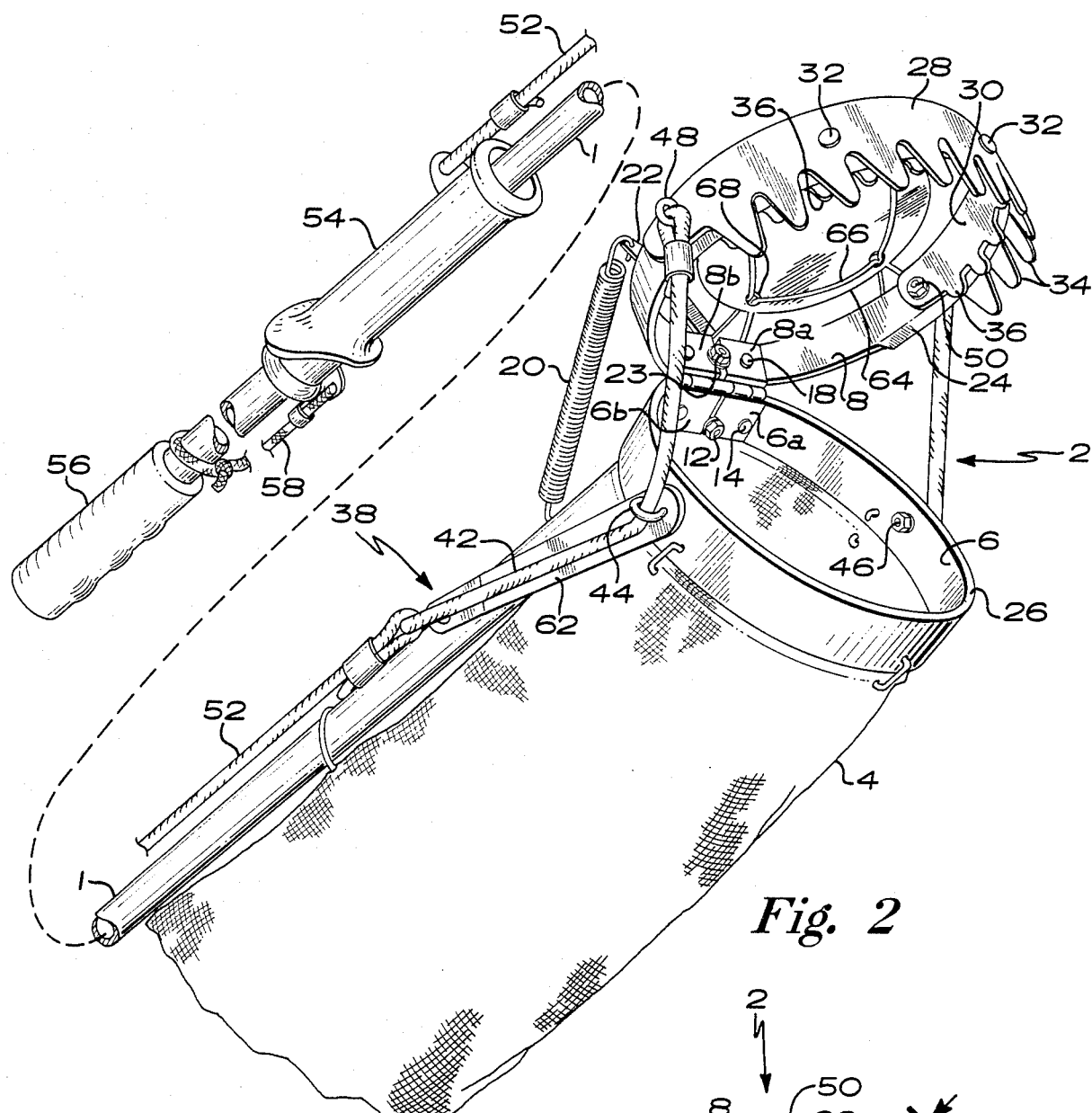
FIG. 2 is a side, perspective view of the fruit picker.

With reference to the drawings, there is shown in FIG. 1 the improved fruit picker as used for picking and collecting fruit from a tree. The fruit picker is basically comprised of an elongated pole 1 which serves as a handle, a fruit collecting jar assembly 2 affixed to the upper end of the pole, and a flexible, fruit receiving chute 4. These basic components are shown in detail in FIGS. 2, 3, and 5.

Jaw assembly 1 is comprised of a stationary bottom ring 6 and a movable top ring 8 which is pivotally attached to pole 1 above bottom rings 6. Bottom ring 6 projects at an angle from its point of rigid connection to the upper end of pole 1. This angle approximates 90° and as is illustrated in FIG. 1, facilitates the placing of bottom ring 6 under a piece of fruit for collection. Bottom ring 6 is preferably rigidly attached to the top of pole 1 by means of a hinge base plate 10. A screw 12 attaches hinge base plate 10 to the top of pole 1. As may be noted most clearly by reference to FIGS. 2 and 3, the straight, flat end segments of 6a and 6b of bottom ring 6 are fastened to hinge base plate 10 by means of rivets 14.

Top ring 8 of the collecting jaw assembly is pivotally mounted above stationary, bottom ring 6. This is accomplished by fastening the flat end segments 8a and 8b of top ring 8 to hinge pivot plate 16, utilizing rivets 18 for that purpose.

Figure 3:
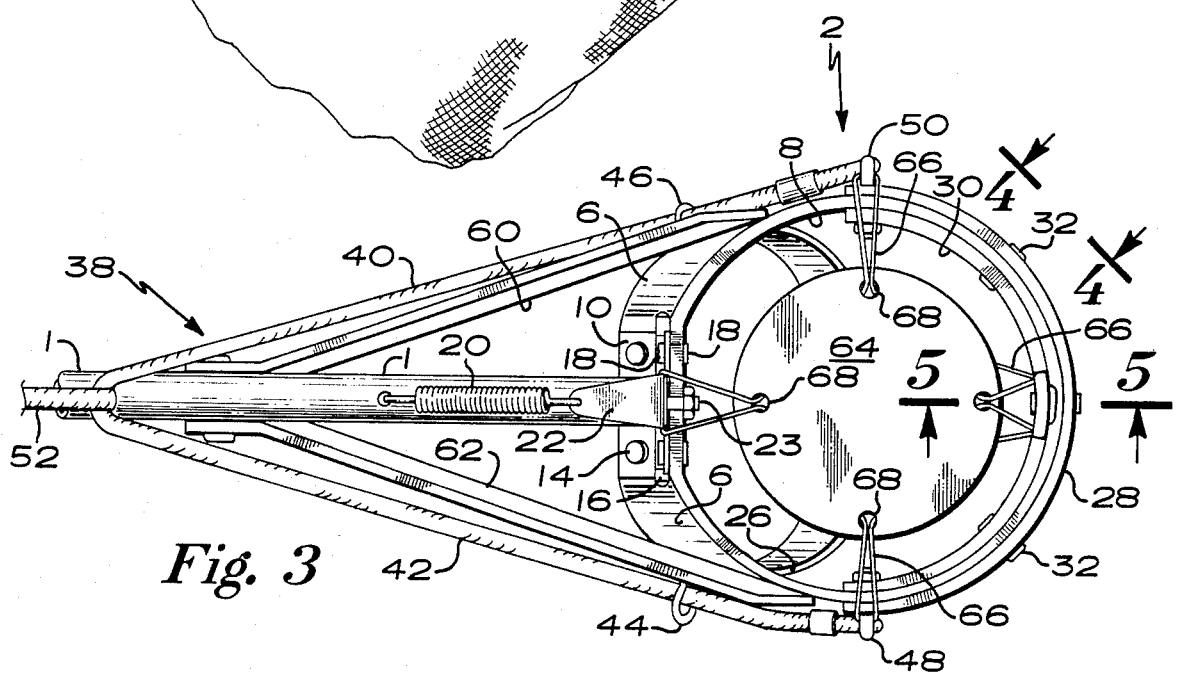
FIG. 3 is a top, plan view of the hinged ring assembly used to pick fruit, and of its operating mechanism.

Top ring 8 is normally held in a rearwardly and upwardly biased open position with respect to bottom ring 6 by means of a retention spring 20. Spring 20 preferably comprises a coil spring attached between top ring 8 and the upper end of the pole 1 at a location thereon below bottom ring 6, as shown in FIGS. 2 and 3. The attachment of spring 20 to top ring 8 is at a location adjacent to the hinge plates 10, 16 which will provide the necessary spring force in such a way as to bias top ring 8 to its normally open position shown in FIG. 2. For that purpose, a rigid ear 22 is affixed to the top end of pole 1 and to hinge pivot plate 16 by means of a threaded fastener 23. Spring connecting ear 22 angles rearwardly as shown in FIG. 3.

As may be noted most clearly by reference to FIGS. 2 and 5, top ring 6 is beveled along its bottom surface to provide a cutting edge 24. This cutting edge is brought to bear against a mating contact surface 26 on bottom ring 6 when top ring 8 is swung downwardly to its closed, fruit stem severing position shown in FIG. 5. The upper surface of bottom ring 6 is flat as shown in FIG. 5. This flat surface extends substantially across the entire width of bottom ring 6 and is of significantly greater width than that of cutting edge 24. Thus, mating contact surface 26 serves as an anvil type of solid cutting surface for stem severing contact by cutting edge 24. The corners of bottom ring 6 may be rounded as shown in FIG. 5 to avoid marring of fruit surfaces.

To further protect against the damaging of fruit, a pair of flexible guard bands 28 and 30 are affixed around the periphery of top ring 8 on both sides thereof. The inner and outer guard bands 28 and 30, respectively, are shown in FIGS. 2 and 5. They are secured to top ring 8 by means of rivets 32, or by other suitable fastening devices. Flexible teeth 34 are formed in outer guard band 28 around the periphery thereof. A similar set of flexible teeth 36 are formed around the bottom periphery of inner guard band 30, and may be of a shorter length than teeth 34 as shown in FIG. 5. Teeth 34 and 36 have rounded bottom tips as shown in FIG. 5 to further preclude any possible damage to fruit being picked. Teeth 34 and 36 all project downwardly from top ring 8 in a direction towards bottom ring 6 below cutting edge 24 on the top ring. This arrangement ensures that teeth 34 and 36 will protect the fruit against damage by cutting edge 24. Also, the relatively closely spaced teeth 34 and 36 as shown in FIG. 2 will assist in engaging a fruit stem therebetween as top ring 8 is lowered against the bottom ring 6, while permitting a stem to be severed between the top and bottom rings in the course of a fruit picking operation.

Guard bands 28 and 30 are made of flexible plastic material such that teeth 34 and 36 will be flexible enough to avoid damaging fruit. Polyethylene plastic has been found to be suitable for that purpose.

Referring again to FIGS. 2 and 3, there is shown a harness loop 38 which is utilized in combination with a pull cord 52 for actuating top ring 8 downwardly in a stem-cutting operation. Harness loop 38 is preferably in the form of a flexible cord having a pair of flexible legs 40 and 42 which are passed through guide apertures 44 and 46 on opposite sides of bottom ring 6. These guide apertures may be in the form of eye screws as shown. A second set of eye screws 48 and 50 are provided at diametrically opposite locations on top ring 8 for the attachment of the free ends of flexible harness legs 40 and 42 thereto. Preferably, the attachment points for eye screws 48 and 50 are substantially midway between the base side of top ring 8 adjacent its hinge pivot plate 16 and the diametrically opposite side of the top ring. Flexible cord legs 40 and 42 attached at such a location on top ring 8 provide the desired leverage when pulled by cord 52 to snap top ring 8 downwardly in a sharp, crisp cutting action which brings cutting edge 24 against mating contact surface 26 on bottom ring 6.

Pull cord 52 is attached as shown in FIGS. 2 and 3 to harness loop 38. It is possible to use pull cord 52 as a loose, freely extending cord to be gripped by the user as shown in FIG. 1 for actuating the fruit stem cutting action of top ring 8. However, it is considered preferable to attach the bottom end of pull cord 52 to a pull sleeve 54 which is slidably and reciprocally mounted on the lower end of pole handle 1. This arrangement is shown in FIG. 2. A fixed hand grip 56 is positioned on handle 1 at a location spaced below pull sleeve 54; and an elastic tension cord 58 is connected between pull sleeve 54 and pole 1. Tension cord 58 maintains slight tension on pull cord 52 and also retains sleeve or slide 54 in its desired position on pole 1.

It is to be noted that bottom ring 6 is further supported on the upper end of pole handle 1 by a pair of rigid bracket arms 60 and 62. These arms are secured to bottom ring 6 by the same eye screws 44 and 46 which serve as guide apertures for flexible harness legs 40 and 42.

To further assist in capturing and collecting fruit, a flexible top cap 64 is affixed to top ring 8. This cap is preferably made of the same flexible, polyethylene material from which guard bands 28 and 30 are formed. It is secured to circumferentially spaced points around the periphery of top ring 8 by elastic retainer means. Such retainer means may comprise a single elastic band 66 from which loops are pulled through holes 68 in top cap 64 as shown in FIG. 3 for attachment to peripheral edge portions of top ring 8. Eye screws 48 and 50, as well as spring connecting ear 22 may serve as attachment means for elastic band 66. The front end of elastic band 66 may be connected to an upwardly projecting tab 67 formed on inner guard band 30, as shown in FIG. 5.

Also, with respect to FIG. 5, it may be seen that the top end of flexible collection chute 4 is folded over on itself to form a hem within which a strengthening and rigidizing ring 70 is positioned. The top end of chute 4 is secured against the underside of bottom ring 6 by a plurality of clips 72 which fasten around the hem and ring 70 and pass through holes provided in bottom ring 6, as shown in FIG. 2.

In operation, a person wishing to collect fruit, such as oranges, will position himself on the ground under a tree as shown in FIG. 1. The handle 1 with the flexible chute 4 attached thereto is extended up into the tree as shown. At this point, pivotal upper ring 8 will be in its normally open position as shown in FIG. 2 to which it is biased by spring 20. Bottom ring 6 of jaw assembly 2 is positioned under a piece of fruit. This operation is facilitated by the normally open position of top ring 8, and by the angular projection of bottom ring 6 from the top end of pole 1. With one hand holding hand grip 56, the other hand grasps pole sleeve 54 and firmly and quickly slides it downwardly. The resulting downward pulling action on cord 52, acting through harness loop 38, snaps top ring 8 firmly downwardly against the top, mating surface 26 of bottom ring 6. As this happens, a fruit stem is gripped and retained between aligned pairs of teeth 36, 34 on inner and outer guard bands 30 and 28. This gripping of the fruit stem assists in the cutting thereof as cutting edge 24 of top ring 8 is brought down firmly against bottom ring 6 as shown in FIG. 5. The piece of fruit as shown in FIG. 5 then drops downwardly through bottom ring 6 into collecting chute 4. Flexible top cap 64 contacts the piece of fruit and helps guide it down through the bottom ring into chute 4. Since cap 64 may be flexibly, resiliently displaced relative to top ring 8, it assists in guiding the fruit into the receiving chute, without damaging it. Also, top cap 64 prevents the fruit from falling out of top ring 8, if the pole should be turned completely around or tilted in such a way that the piece of fruit could otherwise fall through top ring 8. FIG. 4 shows the jaw assembly 2 closed with cutting edge 24 of top ring 8 resting against the top, mating surface 26 of bottom ring 6. It is to be noted that the flexible teeth of the guard bands extend below cutting edge 24 and well below the upper end of bottom ring 6, as shown in FIGS. 4 and 5, to avoid any possible damage to the fruit by cutting edge 24.

The piece of fruit will then fall downwardly through flexible collecting chute 4. It may be received into a basket resting on the ground as shown on FIG. 1. Advantageously, flexible chute 4 may be made of stretch fabric having a degree of elasticity. This permits the user to pull downwardly on the chute so as to stretch it in such a way that the cross sectional area of the chute is diminished. As a result, the chute will have a restricted opening along its length and thereby slow down or catch the fruit as it descends downwardly so that it will not fall so quickly that it might be damaged.

The fruit picker is preferably made of materials which will provide the greatest strength while maintaining a relatively lightweight device. For this purpose, the pole handle 1 could be made of aluminum or bamboo. Cutting jaws 6 and 8 may preferably be made of anodized aluminum, especially upper jaw 8 on which beveled cutting edge 24 is formed. It is believed that the greatest application for the fruit picker disclosed herein will be for orange trees. Any type of citrus fruit could be collected from trees using the improved fruit picker; however, apples and other types of fruit may of course also be collected with this device. The shear type of cutting action provided by the snap closing of top ring 8 against bottom ring 6 ensures the sharp, quick severing of fruit stems approximately one-quarter inch from the surface of the piece of fruit being picked. Since the stems are cut, and not pulled, the quality of the fruit and therefore its value is enhanced.

It is anticipated that various changes may be made in the size, shape, and construction of the fruit picker disclosed herein without departing from the spirit and scope of my invention as defined by the following claims.

What is claimed is:
1. A fruit picker comprising:
an elongated pole handle of sufficient length to permit a person standing on the ground to reach to the upper levels of fruit trees such as orange and apple trees;
a fruit collecting jaw assembly on the upper end of said pole, said jaw assembly comprising a stationary bottom ring affixed to said pole and projecting at an angle thereto, and a movable top ring pivotally attached to said pole above said bottom ring;
a cutting edge extending around the bottom periphery of said top ring;
a mating, contact surface for said cutting edge extending around the upper periphery of said bottom ring;
spring means attached to said top ring and movably biasing said top ring to an open position with respect to said bottom ring;
actuating means manually operable to pivotally swing said top ring downwardly to bring its cutting edge down against said mating contact surface of said bottom ring to thereby sever a fruit stem;
a pair of flexible guard bands of fixed around the periphery of said top ring on both sides thereof and projecting downwardly below said cutting edge on said top ring, whereby said guard bands protect fruit against damage by said cutting edge as said top ring is pivoted down against said mating contact surface on said bottom ring to sever a fruit stem; and
a flexible, fruit receiving chute secured at one end around said bottom ring to receive fruit severed from its stem by said top ring and directed downwardly through said bottom ring.

2. A fruit picker as defined in claim 1 wherein:
flexible teeth are formed in each of said guard bands, around the periphery thereof, said teeth projecting downwardly below said cutting edge in a direction towards said bottom ring, whereby said teeth assist in engaging a fruit stem therebetween while permitting a stem to be severed between said rings in the course of a fruit picking operation.

3. A fruit picker comprising:
an elongated pole handle of sufficient length to permit a person standing on the ground to reach to the upper levels of fruit trees such as orange and apple trees;
a fruit collecting jaw assembly on the upper end of said pole, said jaw assembly comprising a stationary bottom ring affixed to said pole and projecting at an angle thereto, and a movable top ring pivotally attached to said pole above said bottom ring;
a cutting edge extending around the bottom periphery of said top ring;
a mating, contact surface for said cutting edge extending around the upper periphery of said bottom ring;
spring means attached to said top ring and movably biasing said top ring to an open position with respect to said bottom ring;
actuating means manually operable to pivotally swing said top ring downwardly to bring its cutting edge down against said mating contact surface of said bottom ring to thereby sever a fruit stem;
a flexible, fruit receiving chute secured at one end around said bottom ring to receive fruit severed from its stem by said top ring and directed downwardly through said bottom ring; and
a flexible cap covering said top ring to keep fruit from falling out through the top ring as fruit is picked, said flexible cap being attached to said top ring by elastic retainer means, whereby said cap may be resiliently displaced relative to said top ring as it contacts fruit and helps guide the fruit down through the bottom ring and into said chute, without damaging the fruit.

4. A fruit picker as defined in claim 3 wherein:
said elastic retainer means comprises elastic band means connected between peripheral edge portions of said cap and adjacent points around the periphery of said top ring.

* * * * *